United States Patent
Christian et al.

(10) Patent No.: US 12,009,706 B2
(45) Date of Patent: Jun. 11, 2024

(54) DRIVE DEVICE HAVING A BRUSHLESS ELECTRIC MOTOR

(71) Applicant: Brose Fahrzeugteile SE & Co. Kommanditgesellschaft, Bamberg, Bamberg (DE)

(72) Inventors: Uwe Christian, Marktzeuln (DE); Roland Kalb, Rossach (DE); Gabriele Lange, Marktrodach (DE); Helmut Pfalzgraf, Eibelstadt (DE); Wolfgang Strauss, Unterpleichfeld (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 387 days.

(21) Appl. No.: 17/439,432

(22) PCT Filed: Mar. 12, 2020

(86) PCT No.: PCT/EP2020/056702
§ 371 (c)(1),
(2) Date: Sep. 15, 2021

(87) PCT Pub. No.: WO2020/187703
PCT Pub. Date: Sep. 24, 2020

(65) Prior Publication Data
US 2022/0190692 A1 Jun. 16, 2022

(30) Foreign Application Priority Data
Mar. 15, 2019 (DE) .................... 10 2019 203 525.6

(51) Int. Cl.
*H02K 11/33* (2016.01)
*H02K 5/22* (2006.01)
(Continued)

(52) U.S. Cl.
CPC ............. *H02K 11/33* (2016.01); *H02K 5/225* (2013.01); *H02K 11/38* (2016.01); *H02K 7/1166* (2013.01);
(Continued)

(58) Field of Classification Search
CPC ...... H02K 5/225; H02K 7/1166; H02K 11/33; H02K 11/38; H02K 2203/03; H02K 2211/03
(Continued)

(56) References Cited

U.S. PATENT DOCUMENTS 6,177,741 B1    1/2001  Lütkenhaus et al.
6,211,631 B1 *  4/2001  Wilson-Jones ...... H02K 11/215
                                                180/444

(Continued)

FOREIGN PATENT DOCUMENTS

CN    102487225 A    6/2012
CN    203398945 U    1/2014
(Continued)

OTHER PUBLICATIONS

Chinese Office Action for Application No. 202080020287.8, Dated May 5, 2023, English Translation attached to original, All together 22 Pages.
(Continued)

*Primary Examiner* — Rashad H Johnson
(74) *Attorney, Agent, or Firm* — Dickinson Wright PLLC (57) ABSTRACT

A drive device, having a drive housing with a brushless electric motor which can be installed therein and has a stator winding and a rotor and motor electronics with a printed circuit board, the electric motor being insertable into the drive housing via a housing opening. A main stator body has a number of stator teeth which are arranged in a star shape and around which the stator winding is wound, a number of
(Continued)

phase connections of the stator winding being guided into an in particular radially oriented joining position. The printed circuit board has a number of connection sockets corresponding to the number of phase connections, said connection sockets receiving the phase connections as the electric motor is inserted into the drive housing.

15 Claims, 6 Drawing Sheets (51) Int. Cl.
  *H02K 11/38* (2016.01)
  *H02K 7/116* (2006.01)
(52) U.S. Cl.
  CPC ...... *H02K 2203/03* (2013.01); *H02K 2211/03* (2013.01)
(58) Field of Classification Search
  USPC ...................................................... 310/71, 89
  See application file for complete search history.

(56) References Cited

U.S. PATENT DOCUMENTS

| | | | |
|---|---|---|---|
| 9,539,649 B2 | 1/2017 | Nishikawa et al. | |
| 10,079,520 B2 | 9/2018 | Haga et al. | |
| 10,153,605 B2 | 12/2018 | Maerkle | |
| 10,181,763 B2 | 1/2019 | Hwang et al. | |
| 10,843,664 B2* | 11/2020 | Shoda | H02K 21/16 |
| 11,300,127 B2* | 4/2022 | Kataoka | F04D 13/0686 |
| 2013/0169086 A1* | 7/2013 | Chai | H02K 3/28 |
| | | | 310/71 |
| 2013/0313925 A1 | 11/2013 | Mergener et al. | |
| 2014/0183992 A1* | 7/2014 | Seo | H02K 3/522 |
| | | | 310/71 |
| 2016/0380503 A1* | 12/2016 | Hauk | H02K 3/522 |
| | | | 310/68 R |
| 2017/0366070 A1 | 12/2017 | Iso | |
| 2018/0226857 A1* | 8/2018 | Ishizaki | F04D 29/668 |
| 2019/0277079 A1 | 9/2019 | Lange | |
| 2021/0384793 A1* | 12/2021 | Bailey | H02K 11/33 |
| 2022/0149689 A1* | 5/2022 | Schwamberger | H02K 3/522 |
| 2022/0149696 A1* | 5/2022 | Kalb | H02K 5/225 |
| 2022/0209607 A1* | 6/2022 | Franck | H02K 3/50 |
| 2022/0224209 A1* | 7/2022 | Guardiola | H02K 15/02 |
| 2023/0067680 A1* | 3/2023 | Klosterman | H02K 7/145 |
| 2023/0170768 A1* | 6/2023 | Nakamura | H02K 5/1732 |
| | | | 310/71 |

FOREIGN PATENT DOCUMENTS

| | | |
|---|---|---|
| CN | 103732360 A | 4/2014 |
| CN | 105191076 A | 12/2015 |
| CN | 106797153 A | 5/2017 |
| CN | 208015542 U | 10/2018 |
| CN | 208094302 U | 11/2018 |
| DE | 102008033061 A1 | 2/2009 |
| DE | 102009020075 A1 | 11/2009 |
| DE | 102011121716 B3 | 2/2013 |
| DE | 102013113187 A1 | 7/2014 |
| DE | 102013207384 A1 | 10/2014 |
| DE | 102016216888 A1 | 9/2016 |
| DE | 102016216888 A1 | 3/2018 |
| KR | 20160094158 A | 8/2016 |

OTHER PUBLICATIONS

Chinese Notice of Allowance for CN 202080020287.8, English Translation attached to original, Dated Jan. 25, 2024, All together 7 Pages.

* cited by examiner

# DRIVE DEVICE HAVING A BRUSHLESS ELECTRIC MOTOR

CROSS-REFERENCE TO RELATED APPLICATIONS

This application is the U.S. National Phase of PCT Application No. PCT/EP2020/056702 filed on Mar. 12, 2020, which claims priority to German Patent Application No. DE 10 2019 203 525.6, filed on Mar. 15, 2019, the disclosures of which are hereby incorporated in their entirety by reference herein.

TECHNICAL FIELD

The present disclosure relates to a drive device, such as an electromotive adjustment drive of a motor vehicle.

BACKGROUND

A drive device, which, for example as an electromotive adjustment drive of a motor vehicle, drives an adjustment element between two end positions along an adjustment path, typically comprises an electric motor and a transmission coupled with the latter, which is arranged in a drive or transmission housing. The transmission housing is typically connected to the motor housing via a flange-type connection, wherein the electric motor is typically an internal rotor commutator motor that is fitted with brushes. Such drive devices, in particular window regulator drives, are regularly exposed under certain circumstances to extreme humidity and large temperature fluctuations at the intended installation location.

SUMMARY

One or more objects underlying the present disclosure is that of specifying a drive device with an improved connection concept for the phase connections of a brushless electric motor.

A drive device, such as an electromotive adjustment drive for a motor vehicle, may include a drive housing, with a brushless electric motor that can be mounted in the latter, is provided. The electric motor may include a stator with a rotating-field winding, and a rotor with a rotor shaft, which is coupled to, or can be coupled to, a transmission. The electric motor and the transmission may be arranged in a common body of the drive housing, which can be closed by means of a housing cover. The motor electronics, with a printed circuit board, are also arranged in this drive housing.

The electric motor may be inserted into the drive housing, that is to say, into its body, via a housing opening. During this step in the assembly, the printed circuit board of the motor electronics, which may include the printed circuit board, populated with the appropriate (electrical, electronic) components, with a connection interface for the plug-in contact of a connector plug provided on a connection cable, is already positioned in the drive housing.

The stator of the electric motor, which may be an external rotor motor, may include a stator body with a number of stator teeth arranged in a star formation, around which the rotating-field winding is wound. Expediently, the stator body is externally toothed, and appropriately may include a central shaft passage for the rotor shaft. In this design of the electric motor, the rotor may include a rotor housing, surrounding the stator body and coupled to the rotor shaft, with permanent magnets arranged in the housing.

The stator rotating-field winding may include a number of phase connections, which may be guided into, for example, a radially-oriented, joining position. This means that the phase connections, which are the winding ends, or wire ends, of single, double or multiple coils of the rotating-field winding, are bent into a position or location in which a joining connection with corresponding mating structures of the printed circuit board is made possible. For this purpose, the printed circuit board may include a number of connection sockets, corresponding to the number of phase connections, which receive the phase connections precisely in the course of the insertion of the electric motor into the drive housing.

In other words, the phase connections are initially bent separately and in a manner suitable for joining, and the winding ends of each phase are guided individually or jointly out of the stator rotating-field winding in order to be automatically, that is to say, quasi-forcibly, received into the connection sockets, in the course of insertion of the stator with its rotating-field winding and the initially bent phase connections through the housing opening into the drive housing. In this plug-in position, the phase connections can then be selectively soldered to the printed circuit board (in a manner specific to each connection), to produce, for example, a star or a delta circuit.

In one or more embodiments, the drive device, that is to say, the electric motor, may include a sleeve-form guide element on one end face of the stator body. The guide element may include a cylindrical guide shaft, the tubular opening of which is aligned with the opening of the stator body that is serving as a shaft passage. On the outer circumference of the guide shaft, the guide element may include a number of reception grooves, into which sections of the phase connections are inserted. In this manner, the phase connections are positioned and adequately fixed in their desired orientation.

As an example, the reception grooves are oriented so as to run obliquely to the central axis (axial direction) of the stator body at an angle of between 20° and 70°, or between 30° and 60°, or between 40° and 50°, or between 45° and 50°.

The connection sockets for the phase connections may be formed as guide slots running axially with respect to the motor axis, which, starting from a printed circuit board edge facing towards the stator body, extend into the printed circuit board, and may extend parallel to one another.

The printed circuit board of the motor electronics may be arranged within the drive housing, radially spaced apart from the rotor shaft. The connection sockets for the phase connections may have lead-in chamfers, such that the phase connections can be introduced into the connection sockets of the printed circuit board, via the housing opening in the drive housing, in a fail-safe and positionally accurate manner in the course of the plug-in assembly of the electric motor. For this purpose, the phase connections in their joining position are advantageously oriented running parallel to one another, such as in a common joining plane that is orthogonal to the plane of the printed circuit board.

In one or more embodiments, the latter may include a number of radially-extending capping bars, which are inserted on the end face between a corresponding number of stator teeth and the rotating-field winding. In other words, the guide element is supported by its number of capping or supporting bars, which may correspond to the number of stator teeth, on the stator body, and there on one of its end faces. In this assembly position, the winding of the coils of the rotating-field winding around the stator body takes place.

In this manner, the guide element is firmly held on the stator body without further connecting elements.

The present disclosure also relates to the electric motor itself. This electric motor, may be a brushless external rotor motor, that may include a stator, and a rotor with a rotor shaft, together with motor electronics with a printed circuit board. The stator may include a stator body with a number of stator teeth arranged in a star formation, which are provided (wound around) with the stator winding (the rotating-field winding). A number of phase connections of the stator winding are guided into a joining position, in particular a radially-oriented joining position, and the printed circuit board may include a number of connection sockets corresponding to the number of phase connections, into which the phase connections are received, or can be received.

BRIEF DESCRIPTION OF THE DRAWINGS

In what follows an example of embodiment of the invention is explained with reference to the figures. Here.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In a drive device of known art from DE 10 2011 121 716 B3, in particular of an electromotive adjustment drive of a motor vehicle, the transmission and the electric motor, designed as an internal rotor, are arranged in separate housings. In a housing connection region for the electric motor, a housing opening is provided, which is covered by means of a gas-permeable and, in particular, liquid-impermeable, membrane, so as to produce a pressure equalization of the housing interior with the environment, that is to say, the housing exterior.

If a brushless electric motor is used for such a drive device, the stator of which has a multi-phase, usually a three-phase, winding, the phase connections must make contact with the motor electronics supplying current to the three-phase winding. The electrical connection of the phase connections to a printed circuit board, on which the electrical and/or electronic components of the motor electronics are mounted and interconnected, is made by comparatively time-consuming manual soldering, or by means of plug-in connections. Such a plug-in connection, which usually requires two components (metal parts) for each of the (typically) three phases, in the form of a clamping and/or a blade contact for the respective phase connection, and a mating or fork contact on the printed circuit board, is comparatively demanding in terms of components and space.

Parts that correspond to one another are provided with the same reference symbols in all figures.

Figure 1:
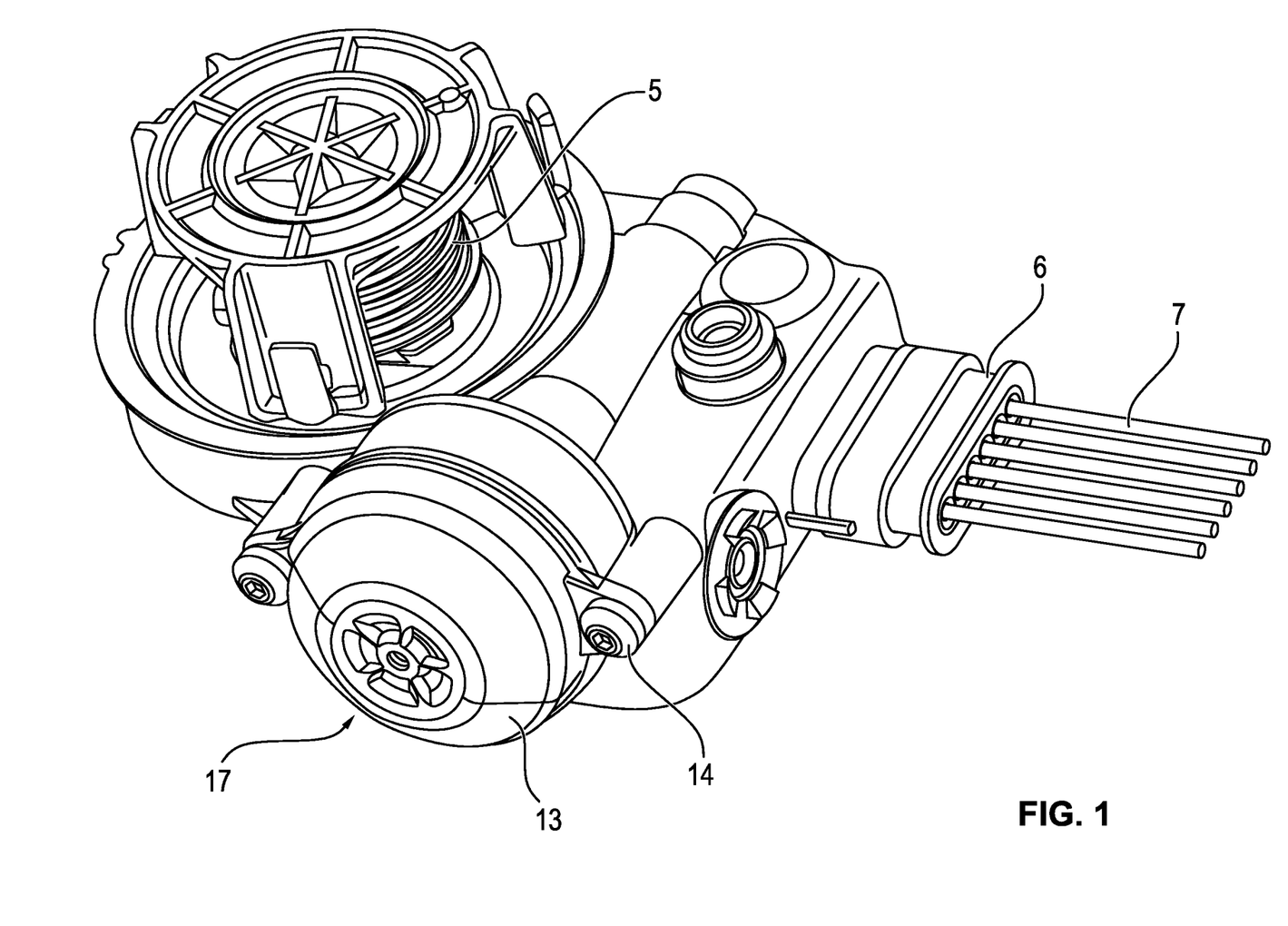
FIG. 1 shows a view in perspective of the drive device, with a drive housing, and an electric motor accommodated in the latter, for purposes of driving a cable drum, as the output drive element of an adjustment device, in particular a window regulator, of a motor vehicle.
Figure 2:
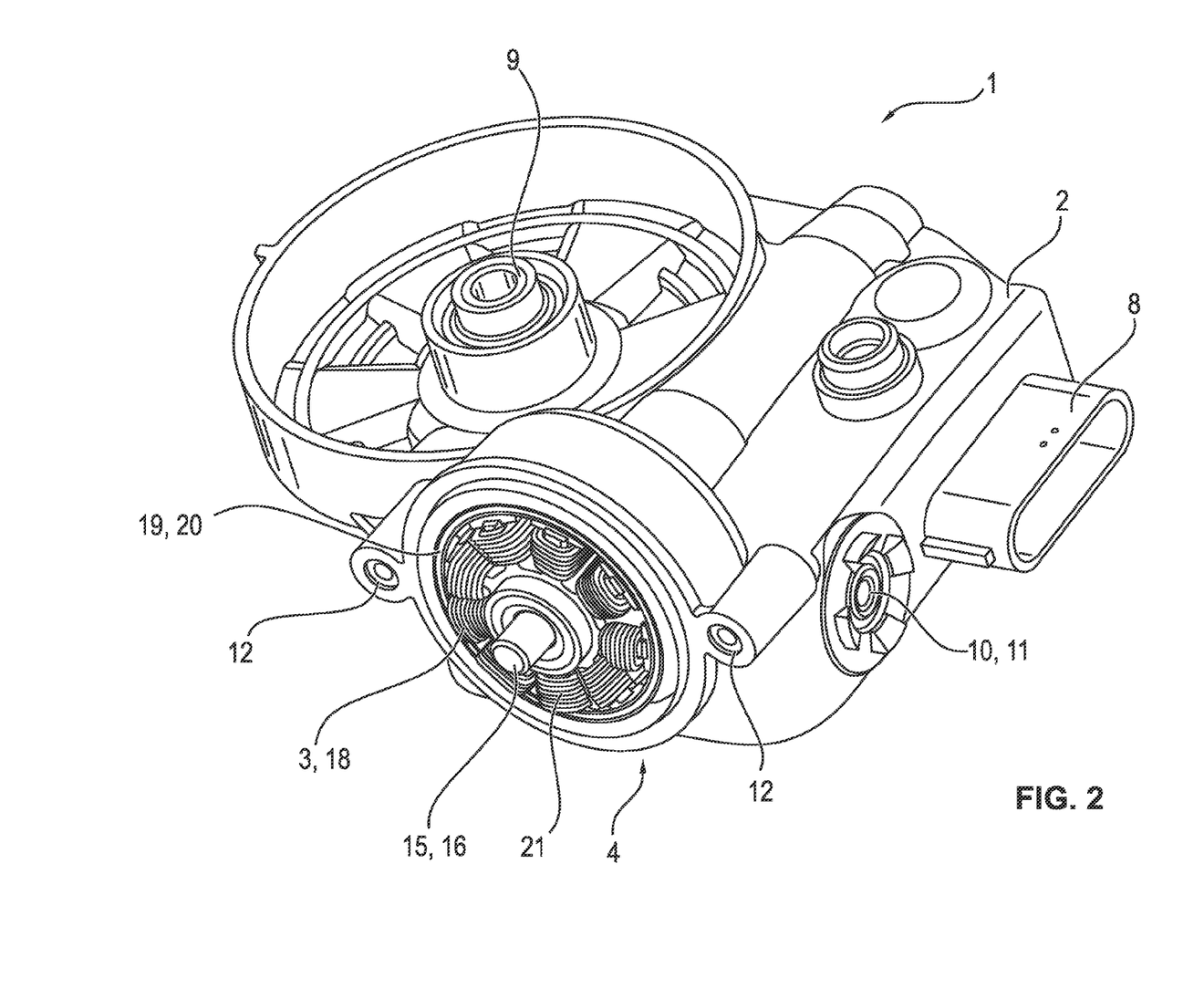
FIG. 2 shows, in a representation in accordance with FIG. 1, the drive device, with a view onto the inserted electric motor, with the (motor) housing cover removed, and without the cable drum.

FIGS. 1 and 2 show a view in perspective of an electric motor drive device 1, with a drive housing 2, into which an electric motor 3 is inserted. For this purpose, the drive housing 2 has a housing opening (the insertion opening) 4, via which the electric motor 3 can be inserted, that is to say, is plugged into the drive housing 2. The electric motor 3 drives an output drive element 5 via a transmission (not shown), which in the example of embodiment is a cable drum for a traction cable, for example of a window regulator of a motor vehicle. A connector plug 6 with connection lines 7 for the supply of current and voltage to the drive device 1, which serves as an adjustment drive of the motor vehicle, and for the supply and/or recovery of control or sensor signals, is plugged into a connection socket 8 on the housing.

The transmission of the drive device 1 is a 90°-deflection transmission, in particular a worm gear, the worm wheel of which drives the output drive element 5 via a drive journal or shaft journal 9. A ventilation opening 10 on the housing is covered by a membrane 11 that is impermeable to gas and/or liquid. The housing opening 4 is flanked by two connecting pins 12 for the attachment (a screwed attachment) of a housing cover 13. For this purpose, by means of screws 14 accommodated in the connecting pins 12, the housing cover 13 is attached to the drive housing 2 in the region of the housing opening 4. A shaft journal 15 of a motor shaft (rotor shaft) 16 is, for example, also mounted in the housing cover 13 at a bearing point 17, or is merely seated there.

Figure 3:
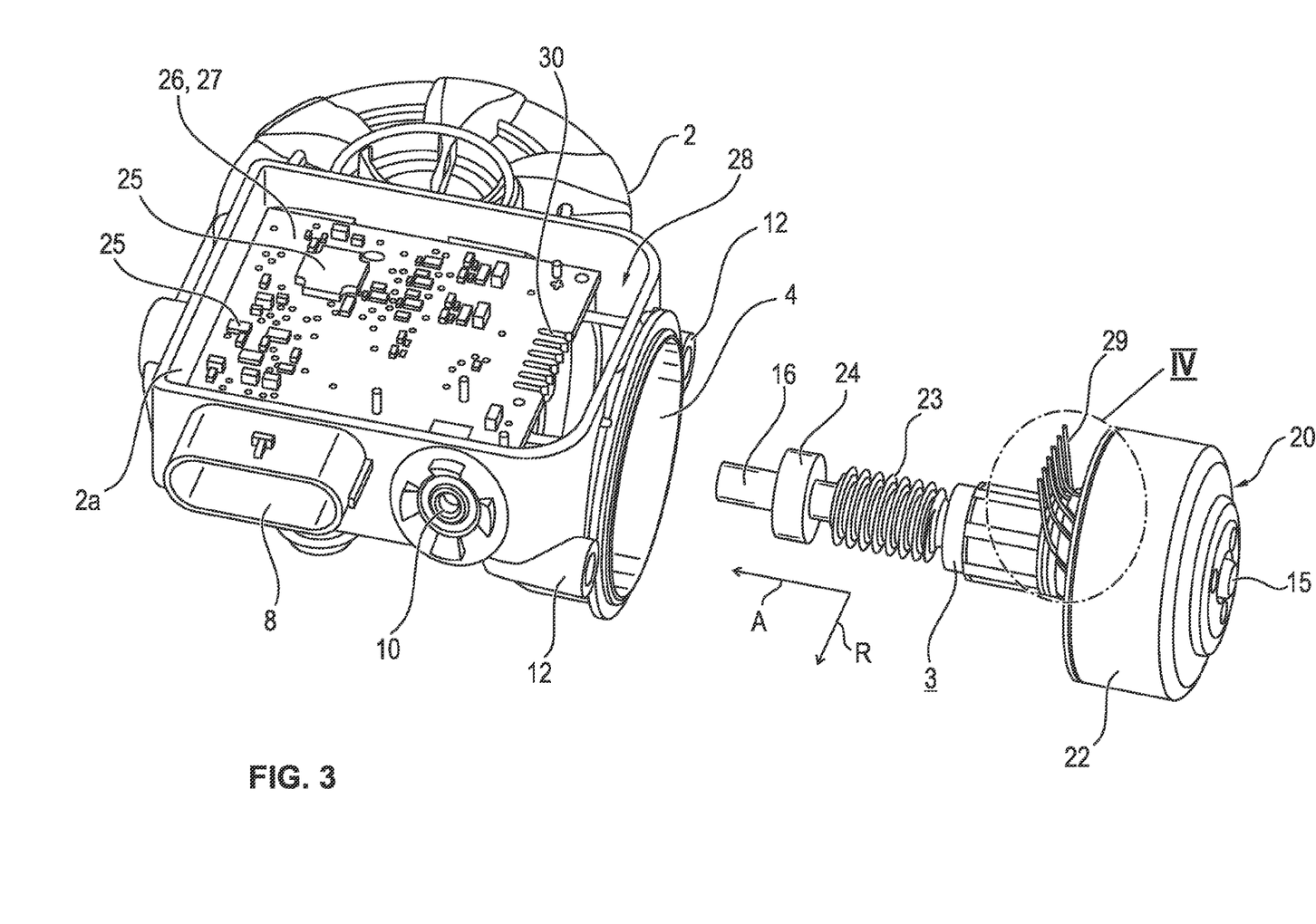
FIG. 3 shows an exploded view of the drive device with the electric motor in a pre-assembly position before insertion into the drive housing, with a view into the drive housing, on the opposite side of the housing to FIG. 1, with the (electronics) housing cover removed.
Figure 7:
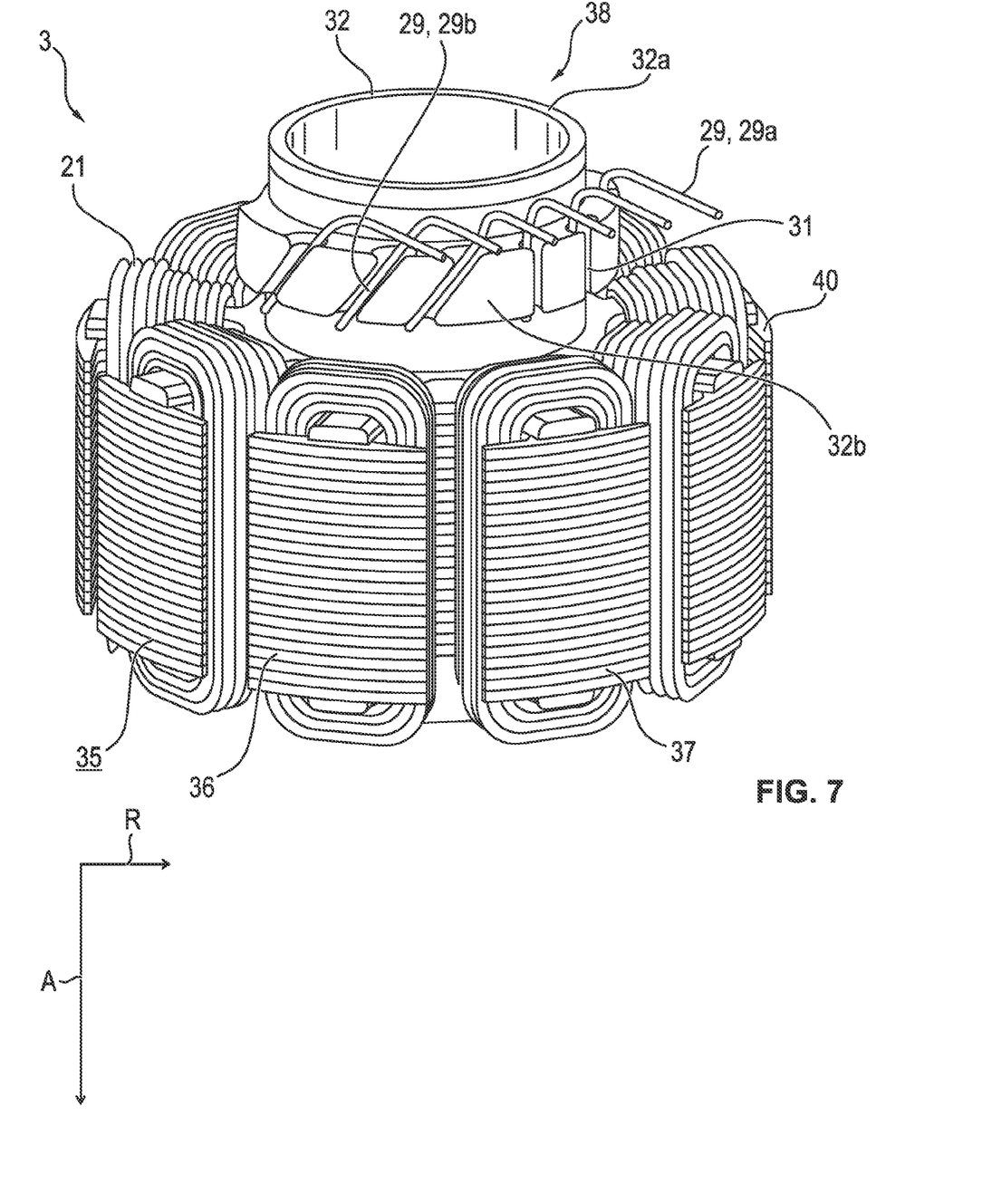
FIG. 7 shows a view in perspective of the stator of the electric motor, with a guide element arranged on the end face, with a number of reception grooves and radially-extending capping bars, around which, together with the stator teeth, the rotating-field winding is wound.

With reference to FIG. 3, the electric motor 3 has a stator 18 and a rotor 20 formed from permanent magnets 19. The stator 18 carries a stator winding or rotating-field winding 21, hereinafter simply referred to as a winding (FIG. 7).

In accordance with FIG. 3, the permanent magnets 19 of the rotor 20 are arranged in a cup-form housing (the rotor housing) 22 on the inner wall. The housing 22 is connected to the rotor or motor shaft 16 in a rotationally fixed manner via a shaft journal, and thus rotates within the housing cover 13 around the stator 18, which is fixed in the drive housing 2 of the brushless electric motor 3, which is thus designed as an external rotor motor. The rotor shaft 16 carries a worm 23, which, in the assembled state, meshes with a worm wheel (not shown) of the transmission. In addition, a magnetic signal transmitter (pole wheel) 24 is seated in a fixed manner on the rotor shaft 16, and interacts in a contactless manner with a magnetic sensor (not shown), for example a Hall sensor, in order to determine or ascertain the rotational speed and the direction of rotation of the rotor shaft 16.

Inside the drive housing 2 there is located a printed circuit board 26 of the motor electronics 27, populated with electronic and/or electrical components 25. Here the interior 28 of the drive housing 2 is accessible via a housing opening 2a, which opening is closed by means of a housing cover (not shown), following the assembly of the transmission and the motor electronics 27, including the printed circuit board 26.

Following the assembly of the printed circuit board 26, the electric motor 3 is pushed, inserted, that is to say, plugged, into the drive housing 2 via the housing opening 4. The printed circuit board 26 is assembled in the drive housing 2, radially spaced apart from the rotor shaft (motor shaft) 16, with reference to the axial direction A and radial direction R as indicated. In this position, the pole wheel 24 is positioned appropriately with respect to the magnetic sensor as one of the components or elements 25 for the contactless detection of rotational speed and direction of rotation of the rotor shaft (motor shaft) 16 of the electric motor 3.

Figure 4:
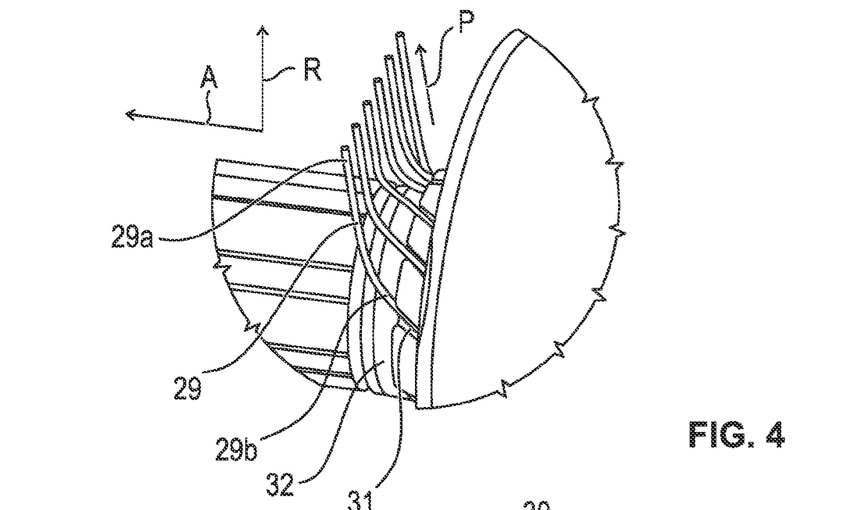
FIG. 4 shows a detail IV of FIG. 3 at a larger scale with phase connections arranged in their joining position for the reception into joining recesses of the printed circuit board.
Figure 5:
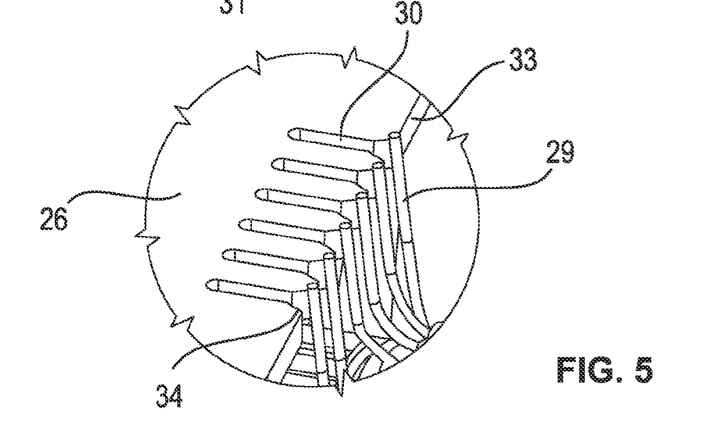
FIG. 5 shows, in a representation in accordance with FIG. 4, the phase connections directly in front of their joining position in the recesses of the printed circuit board.
Figure 6:
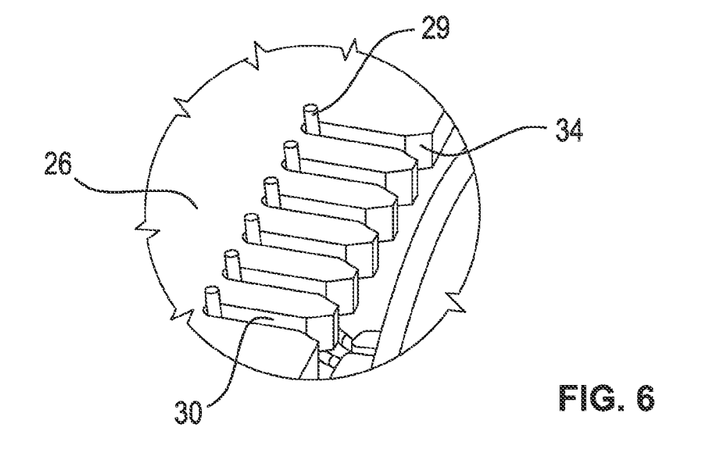
FIG. 6 shows, in a representation in accordance with FIG. 5, the phase connections in their final position in the recesses of the printed circuit board.

With reference to FIGS. 4 to 6, in the course of the insertion of the electric motor 3 into the drive housing 2, a plug-in or joining connection of phase connections 29 of the winding (rotating-field or stator winding) 21 of the electric motor 3 with connection sockets 30 of the printed circuit board 26 takes place within the drive housing 2. For this purpose, the phase connections 29 are brought into a radially-oriented joining position P, as illustrated in FIG. 4 by means of the arrow.

Of the total of six phase connections 29 in the example of embodiment, only two phase connections are provided with the reference symbols 29 in FIG. 4, for the sake of clarity. The axial direction A and the radial direction R, which refer to the axis of rotation of the electric motor 3 and its rotor shaft 16, are indicated in FIGS. 3 and 4.

It can be seen that the phase connections 29 are arranged with at least their end sections 29a running parallel to one another; these are provided for the joining connection with the printed circuit board 26, and are bent up into the intended joining position P for this purpose. The transition sections 29b of the phase connections 29, which adjoin the individual coils of the winding 21 of the electric motor 3 at the end sections 29a, run in reception grooves 31. The latter are provided in a guide element 32, which is described in detail below with reference to FIGS. 7 and 8.

FIGS. 5 and 6 show two successive assembly positions during, or in the course of, the insertion of the electric motor 3, via the housing opening 4, into the drive housing 2. FIG. 5 shows the position of the phase wires or phase connections 29 in the axial direction A, which also corresponds to the direction of insertion of the electric motor 3 via the housing opening 4 into the drive housing 2, directly in front of the corresponding connection sockets 30 of the printed circuit board 26.

The connection sockets 30 are introduced into the printed circuit board 26, such as running parallel to one another, starting from a printed circuit board edge 33 facing towards the electric motor 3, that is to say, its stator 18. The respective connection socket 30 has a lead-in chamfer 34 in the region of the said printed circuit board edge 33. This ensures a reliable, in particular a fail-safe, insertion of the phase connections 29 into the slot-shaped connection sockets 30 of the printed circuit board 26, in the course of the assembly of the electric motor 3, which can also be automated.

FIG. 6 shows that final assembly state, in which the phase connections 29 are received in the slot-shaped connection sockets 30 in the intended final position. In the said final position, the phase connections 29 are soldered to corresponding connection points on the printed circuit board 21, in a manner that is not further specified.

FIG. 7 shows a view in perspective of the stator 18 of the electric motor 3. The stator 18 has a stator body 35. The latter is formed by a stack of individual, stacked laminations (individual sheets) 36. The stator body 35 is externally toothed, that is to say, the individual stator teeth 37 extend (radially) outwards in a star formation. The winding (stator/rotating-field winding) 21 is applied to the stator teeth 37 of the stator body 35 in the form of individual coils (or double coils). The coil ends form the phase connections 29 with their two sections 29a and 29b.

The stator body 35 has a central shaft passage 38 for the rotor shaft 16. This shaft passage 38 is continued in the guide element 32 in the axial direction A in alignment with the latter. The guide element 32 has a sleeve-form guide shaft 32a. The reception grooves 31 are provided in the latter on the outer circumference 32b, in which grooves the phase connections 29 are inserted with their respective transition sections 29b. In this manner, the phase connections 29 are brought into their intended joining position P, and there held.

Of the total of six (6) phase connections 29 in the example of embodiment, in the case of a three-phase winding (rotating-field or stator winding) 21, three phase connections 29 are electrically connected to each other or to each other on the printed circuit board to form the desired circuitry, for example a star or a delta circuit. Each of the three phase windings may have a number of stator coils or coil pairs (double or multiple coils) applied to the stator body 35, which then in each case form two coil or phase ends, which make contact as phase connections 29 to provide the desired circuitry on the printed circuit board 26. Three of these phase connections 29 are electrically connected to corresponding lines 7 via the connector plug 6 for the supply of current of the respective phase (phase winding) on the printed circuit board 26.

Figure 8:
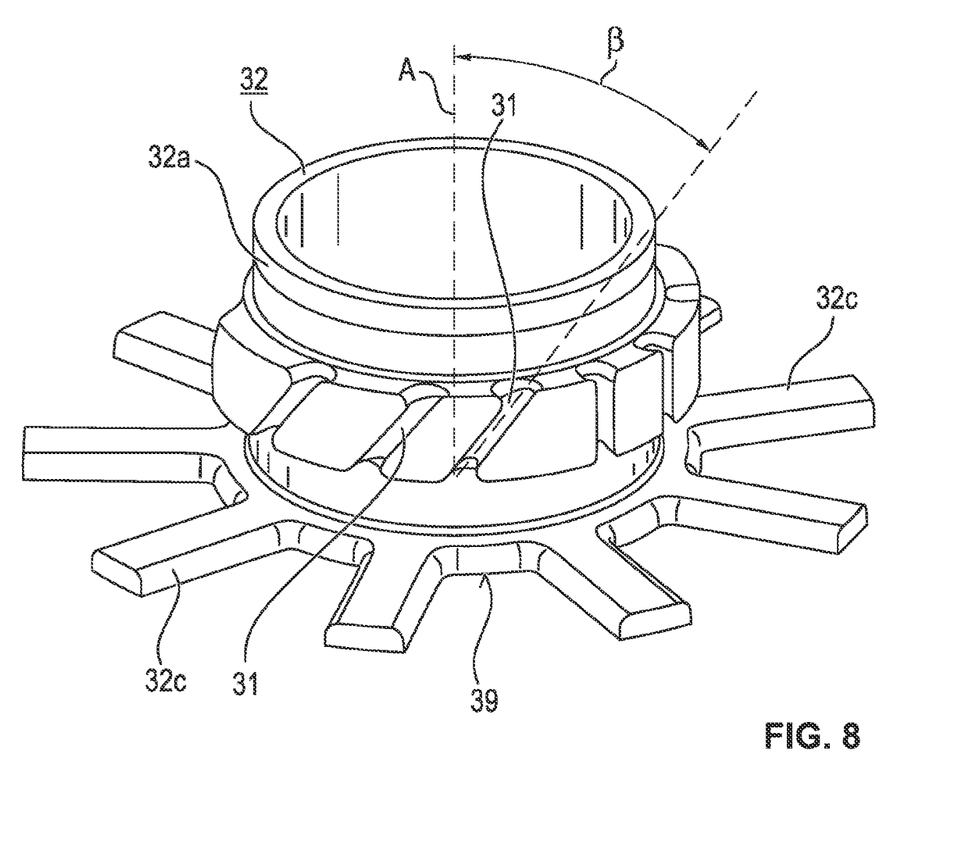
FIG. 8 shows a view in perspective of the guide element with a sleeve-form guide shaft, and radially-extending capping or supporting bars.

FIG. 8 shows the guide element 32 in a view in perspective. Capping bars 32c, extending in the radial direction R, are formed on the sleeve-form or cylindrical guide shaft 32a at the lower sleeve end face 39 in FIG. 8. With these capping bars 32c, the guide element 32 rests on the end face of the stator body 35, and is thereby supported on the corresponding end face 40, in FIG. 7 the upper end face, of the stator body 35. In this assembly position, the capping bars 32c rest on the corresponding sections of the stator teeth 37. In this state of the assembly, the winding 21 is applied onto the stator body 35.

The angle $\beta$ with respect to the axial direction A, running parallel to the axis of rotation of the rotor 16, may be between 20° and 50°. In the example of embodiment, the angle β is between 40° and 50°, and may be 45°. This may provide an advantageous orientation and positioning of the phase connections 29. An angling of the phase connections 29, that is to say, of the end section 29a, is, or can be, provided that is compatible with production.

The claimed invention is not limited to the above-described example of embodiment. In fact, other variants of the invention may also be derived therefrom, by the person skilled in the art, within the scope of the disclosed claims, without any departure from the subject matter of the claimed invention. Furthermore, in particular, all the individual features described in connection with the various examples of embodiments can also be combined in other ways, within the scope of the disclosed claims, without any departure from the subject matter of the claimed invention.

Thus, the electric motor 3, may be an external rotor motor, with a stator 18, and with a rotor 20 with a rotor shaft 16, and with motor electronics 27 with a printed circuit board 26, represents an autonomous invention. In this case, the stator 18 has a stator body 35 with a number of stator teeth 37, which are arranged in a star formation and are wound around with the stator winding 21, wherein a number of phase connections 29 of the stator winding 21 are guided into a joining position P, for example, a radially-oriented joining position P, and wherein the printed circuit board 26 has a number of connection sockets 30, which corresponds to the number of phase connections 29, and in which the phase connections 29 are received, or can be received. The connection sockets 30 may be slot-shaped, but may also be hole-shaped.

Moreover, the described solution can be used not only in the application specifically illustrated, but also in a similar embodiment in other motor vehicle applications, such as in door and tailgate systems, in vehicle locks, in adjustable seat and interior systems, and in other electric drives, controls, sensors and their arrangement in the vehicle.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SYMBOLS

1 Drive device
2 Drive housing
2a Housing opening
3 Electric motor
4 Housing opening/insertion opening
5 Output drive element
6 Connector plug
7 Connection line
8 Connection socket
9 Drive journal/shaft journal
10 Ventilation opening
11 Membrane
12 Connecting pin
13 Housing cover
14 Screw
15 Shaft journal
16 Motor shaft/rotor shaft
17 Bearing point
18 Stator
19 Permanent magnet
20 Rotor
21 Stator winding/rotating-field winding
22 Rotor housing/housing
23 Worm
24 Signal transmitter/pole wheel
25 Component
26 Printed circuit board
27 Motor electronics
28 Interior
29 Phase connection
29a End section
29b Transition section
30 Connection socket
31 Reception groove
32 Guide element
32a Guide shaft
32b Outer circumference
32c Capping bar/support bar
33 Printed circuit board edge
34 Lead-in chamfer
35 Stator body
36 Lamination/individual sheet
37 Stator tooth
38 Shaft passage
39 Sleeve end face
40 End face
A Axial direction
R Radial direction
P Joining position While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The invention claimed is:

1. A drive device for use in a motor vehicle, the drive device comprising:
a drive housing defining a housing opening;
motor electronics provided with a printed circuit board; and
a brushless electric motor configured to be inserted into the housing opening and including,
a stator winding provided with a number of phase connections, a stator provided with a stator body including a number of stator teeth arranged in a star formation, wherein the stator winding is wound around the number of stator teeth, and a rotor including a rotor shaft, wherein the rotor is configured to be coupled to the motor electronics, wherein the rotor is an external rotor, wherein the stator body is externally toothed and forms a central shaft passage configured to receive the rotor shaft, wherein the rotor includes a rotor housing surrounding the stator body and permanent magnets disposed in the rotor housing, wherein the rotor housing is coupled to the rotor shaft, wherein the number of phase connections of the stator winding are guided into a radially-oriented joining position, wherein the printed circuit board includes a number of connection sockets configured to receive the number of phase connections in the course of inserting the electric motor into the drive housing, and wherein the electric motor defines a motor axis, and the number of connection sockets are formed by guide slots, wherein the guide slots extend axially with respect to the motor axis of the electric motor from an edge of the printed circuit board, wherein the edge faces towards the stator body.

2. The drive device of claim 1, further comprising:
a sleeve-form guide element extending from an end face of the stator body, wherein an outer circumference of the guide element forms a number of reception grooves configured to receive sections of the number of phase connections.

3. The drive device of claim 2, wherein the stator body defines a central axis and the number of the reception grooves are oriented to extend obliquely with respect to the central axis at an angle ranging between 20° and 70°.

4. The drive device of claim 3, wherein the angle ranges between 30° and 60°.

5. The drive device of claim 3, wherein the angle ranges between 40° and 50°.

6. The drive device of claim 3, wherein the angle ranges between 45° and 50°.

7. The drive device of claim 2, wherein the guide element includes a number of radially-extending capping bars inserted on the end face between the number of stator teeth and the stator winding.

8. The drive device of claim 1, wherein the printed circuit board is arranged within the drive housing and radially spaced apart from the rotor shaft.

9. The drive device of claim 1, wherein the number of connection sockets include lead-in chamfers formed by the printed circuit board.

10. The drive device of claim 1, wherein the guide slots extend parallel to one another and into the printed circuit board.

11. The drive device of claim 1, wherein when the number of phase connections are in the joining position, the number of phase connections extend parallel to one another.

12. The drive device of claim 11, wherein when the number of phase connections are in the joining position, the number of phase connections are disposed in a common plane.

13. An electric motor comprising:
a stator defining a central axis and including a stator winding and a stator body provided with a number of stator teeth arranged in a star formation, wherein the stator winding is wound around the number of stator teeth and includes a number of phase connections;
a rotor provided with a rotor shaft;
motor electronics including a printed circuit board; and
a guide element,
wherein a number of phase connections of the stator winding are guided into a joining position, and
wherein the printed circuit board includes a number of connection sockets configured to receive the number of phase connections, and
wherein an outer circumference of the guide element forms a number of reception grooves configured to receive sections of the number of phase connections, wherein the number of reception grooves extend in a direction oblique to the central axis.

14. An electric motor for use in a motor vehicle, the electric motor comprising:
a stator including,
a stator body defining a central axis and provided with a number of stator teeth arranged in a star formation, and
a stator winding wound around the number of stator teeth and provided with a number of phase connections;
a printed circuit board forming number of phase connection configured to receive the number of phase connections; and
a sleeve-shaped guide element extending from an end face of the stator body, wherein an outer circumference of the guide element forms a number of reception grooves configured to receive sections of the number of phase connections, wherein the number of reception grooves extend in a direction oblique to the central axis.

15. The electric motor of claim 14, wherein the guide element includes a number of radially-extending capping bars inserted on the end face between the number of stator teeth and the stator winding.

* * * * *